(12) United States Patent
Gerster et al.

(10) Patent No.: US 10,686,404 B2
(45) Date of Patent: Jun. 16, 2020

(54) METHOD FOR TESTING THE DIE-ATTACH OF A PHOTOVOLTAIC CELL ASSEMBLY

(71) Applicant: Saint-Augustin Canada Electric Inc., Saint-Augustin de Desmaures (CA)

(72) Inventors: Eckart Gerster, Freiburg (DE); Hannes Meyer-Schönbohm, Freiburg (DE)

(73) Assignee: Saint-Augustin Canada Electric Inc., Quebec (CA)

( * ) Notice: Subject to any disclaimer, the term of this patent is extended or adjusted under 35 U.S.C. 154(b) by 108 days.

(21) Appl. No.: 15/576,658

(22) PCT Filed: May 17, 2016

(86) PCT No.: PCT/EP2016/060956
§ 371 (c)(1),
(2) Date: Nov. 22, 2017

(87) PCT Pub. No.: WO2016/188786
PCT Pub. Date: Dec. 1, 2016

(65) Prior Publication Data
US 2018/0123511 A1    May 3, 2018

(30) Foreign Application Priority Data

May 26, 2015 (DE) .................. 10 2015 209 612

(51) Int. Cl.
*H02J 7/00*  (2006.01)
*H02S 50/10*  (2014.01)

(52) U.S. Cl.
CPC .................. *H02S 50/10* (2014.12)

(58) Field of Classification Search
USPC ........... 324/761.01, 750.3, 764.01, 693, 697
See application file for complete search history.

(56) References Cited

U.S. PATENT DOCUMENTS 5,691,567 A * 11/1997 Lo ................. H01L 23/4334
257/675
6,512,458 B1 * 1/2003 Kobayashi .......... H02S 50/10
340/507

(Continued)

FOREIGN PATENT DOCUMENTS

DE       202011104880 U1    1/2012
EP           2746793 A1     6/2014

OTHER PUBLICATIONS

Chinese Search Report for Chinese Application No. 201680030167, dated Sep. 14, 2018, 2 pages.
(Continued)

*Primary Examiner* — Vincent Q Nguyen
(74) *Attorney, Agent, or Firm* — TraskBritt (57) ABSTRACT

A method for testing the die-attach quality of a photovoltaic cell assembly, in particular, for electrical inline monitoring of a photovoltaic cell die-attach quality during the manufacturing of a concentrator photovoltaic module, comprises the steps of providing a photovoltaic cell assembly comprising at least one photovoltaic cell, in particular, a concentrator photovoltaic cell, attached to a heat sink, injecting a current into the photovoltaic cell assembly, measuring the voltage across the photovoltaic cell during the current injection, and determining the relative voltage drop over the duration of the current injection, whereby insufficiently bonded photovoltaic cell assemblies can be identified and screened.

20 Claims, 4 Drawing Sheets

(56) References Cited

U.S. PATENT DOCUMENTS

| | | | | |
|---|---|---|---|---|
| 2009/0104342 A1* | 4/2009 | Wang | ............... | B23K 26/36 |
| | | | | 427/8 |
| 2013/0300448 A1 | 11/2013 | Tseng | | |
| 2014/0097522 A1 | 4/2014 | Fidaner et al. | | |
| 2015/0333693 A1* | 11/2015 | Suthues | ............ | H01L 31/186 |
| | | | | 324/761.01 |
| 2016/0329863 A1* | 11/2016 | Higuchi | ............ | H02S 50/00 |

OTHER PUBLICATIONS

Chinese First Office Action for Chinese Application No. 201680030167, dated Sep. 26, 2018, 7 pages.
Canadian Office Action for Canadian Application No. 2,986,638, dated Oct. 9, 2018, 4 pages.
German Search Report for German Application No. 10 2015 209 612.2, dated Jan. 27, 2016, 10 pages.
International Search Report for International Application No. PCT/EP2016/060956 dated Jun. 21, 2016, 3 pages.
International Written Opinion for International Application No. PCT/EP2016/060956 dated Jun. 21, 2016, 4 pages.
Plesz et al., Characterization of Solar Cells by Thermal Transient Testing, Proceedings of the 17th International Workshop on Termal Investigations of ICs and Systems, Terminic 2011, Sep. 27-29, 2011(abstract only).
Chinese Second Office Action for Chinese Application No. 201680030167, dated Jun. 13, 2019, 8 pages with English Translation.

* cited by examiner

METHOD FOR TESTING THE DIE-ATTACH OF A PHOTOVOLTAIC CELL ASSEMBLY

CROSS-REFERENCE TO RELATED APPLICATIONS

This application is a national phase entry under 35 U.S.C. § 371 of International Patent Application PCT/EP2016/060956, filed May 17, 2016, designating the United States of America and published in English as International Patent Publication WO 2016/188786 A1 on Dec. 1, 2016, which claims the benefit under Article 8 of the Patent Cooperation Treaty to German Patent Application Serial No. 10 2015 209 612.2, filed May 26, 2015.

TECHNICAL FIELD

The present invention relates to a method for testing the die-attach of a photovoltaic cell assembly, in particular, for electrical inline monitoring of a concentrator photovoltaic (CPV) cell die-attach quality during the manufacturing of concentrator photovoltaic modules.

BACKGROUND

It is generally known that a low operating temperature is necessary in order to increase the efficiency and the long-term stability or lifetime of photovoltaic cells. Thus, excess heat generated in the cell by irradiation not converted into electrical energy needs to be extracted. This extraction can be carried out by passive or active cooling means, wherein active cooling can be achieved, for example, by dynamic contact with a cooling fluid, and passive cooling can be achieved by attaching the cell to a heat sink.

Die-attach or die-bonding is the process of attaching a semiconductor die or chip to a substrate, a package, or another die or chip. For a photovoltaic cell assembly, this corresponds, in particular, to the process of attaching the solar cell to a heat sink, which can be used for passive cooling as mentioned above. It is generally known that this attachment can be carried out by soldering, welding, adhesive bonding, sintering and the like, and that the quality of the attachment layer obtained by either of these methods is important for efficiently transferring waste heat from the photovoltaic cell to the heat sink.

The quality of the die-attach is, therefore, a crucial parameter for characterizing photovoltaic cell assemblies, in particular, in view of efficiently discarding defective photovoltaic cell assemblies, meaning assemblies for which the die-attach fails in efficiently conveying heat from the cell to the heat sink, prior to the assembly of photovoltaic modules comprising a frame, and one or more photovoltaic cell assemblies. This is even more important for concentrator photovoltaic modules comprising corresponding lenses for focusing light on the cells, as these assemblies are expensive, and the replacement of a defective photovoltaic cell assembly therein is complex and costly.

It is generally known to use thermal transient testing to verify the die-attach of an LED to its mounting substrate. Such methods take advantage of the linear nature of the temperature coefficient of the LED material being tested and the fact that the thermal mass of the LED is several orders of magnitude less than that of the mounting substrate. The forward voltage of the LED is first measured using a small low-heating measurement current, which is chosen low so as to essentially not introduce any negligible heating in the LED device. The LED is then subjected to a short non-destructive heating current. Quickly after removal of the heating current, the measurement current is re-applied and the forward voltage is re-measured and compared to the value measured before the heating pulse. The difference in forward voltage before and after application of the heating current and the temperature coefficient of the LED material are then used to determine the temperature rise of the LED above the mounting substrate temperature. A time-consuming temperature calibration on the measurement points (which are stabilized in temperature) by an external temperature sensor allows the calibration of such measurements to absolute values of the thermal resistance.

A method of thermal transient testing for characterizing an already fully assembled solar module under operating conditions is disclosed in B. Plesz, et al., 2011 (*Characterization of solar cells by thermal transient testing*; Proceedings of the 17$^{th}$ International Workshop on Thermal investigations of ICs and Systems, THERMINIC 2011, held on 27-29 Sep. 2011 in Paris, France). This document discloses, in particular, a method for testing and characterizing the quality of the die-attach in a concentrator photovoltaic module, which is used for the quality management of the fully assembled module or for testing the module during operating conditions.

However, further to being performed only on a fully assembled photovoltaic module and characterizing the same under operating conditions, especially in the case of concentrator photovoltaic modules, the method of B. Plesz, et al., 2011, requires measurements of absolute values of the thermal resistance (Rth), and a temperature-sensitive calibration, which needs to be performed under dark conditions, in other words, when the solar module is not being irradiated. In particular, the temperature-sensitive parameter value has to be calibrated for each device under test to measure the temperature dependency of the forward voltage of the diode. The method further uses a constant sensor current driven through the diode, while the forward voltage values are measured at selected temperature-sensitive points.

Thus, the method disclosed in B. Plesz, et al., 2011, like other known methods of die-attach testing, is too time consuming and too complex to be integrated in a manufacturing line, in particular, prior to assembling the photovoltaic modules. In other words, this testing method cannot be integrated or automated as a part of the manufacturing process of photovoltaic cell assemblies and can only be implemented at a later stage, on a sampling basis, for instance, for device characterization during the operation of the already fully assembled photovoltaic cell assembly.

As a consequence, the method disclosed in B. Plesz, et al., 2011, is not usable to prevent the assembly of full photovoltaic modules comprising one or more defective photovoltaic cell assemblies.

In other words, there is a strong need in the photovoltaic industry for a suitable method for efficiently monitoring the die-attach quality in a photovoltaic cell assembly. In particular, there is a need for a method of inline monitoring that allows discarding nonviable photovoltaic cell assemblies immediately, preferably prior to being conveyed to the assembly lines for assembling photovoltaic modules.

BRIEF SUMMARY

An object of the present invention is, therefore, to provide a method of testing the die-attach of a photovoltaic cell assembly taking into account the aforementioned problems. In particular, an object of the present invention is to provide a quick and reliable test method and, consequently, a method that can be used for inline testing and/monitoring of the die-attach during the manufacturing process of photovoltaic cell assemblies in order to discard defective assemblies, in particular, prior to the assembly of photovoltaic modules.

The object of the invention is achieved with a method for testing the die-attach of a photovoltaic cell assembly according to an embodiment of the disclosure. Advantageous features are described in further embodiments and will also be hereinafter detailed.

The invention takes advantage of the known temperature sensitivity of the forward voltage that can be measured across a photovoltaic cell, which is essentially a series of p-n junctions, to test the die-attach quality of an assembled photovoltaic cell with heat sink.

Thereby, insufficient adhesion, gaps or voids resulting in the incorrect placement or attachment of the photovoltaic cell on the heat sink can be detected easily.

In particular, the voltage, and hence the electrical resistance, of the photovoltaic cell assembly can be monitored during application of a current. The current can preferably be a high forward current. It can preferably also be a current pulse or a series of pulses. The photovoltaic cell acts as an electrically resistive element and heats up rapidly during the injection of the current. The extent of the heating is then recorded by measuring the voltage across the photovoltaic cell during the current injection.

The measured voltage can be used to determine the electrical resistance of the photovoltaic cell assembly. In preferred embodiments, the voltage measurements and/or the determination of the electrical resistance can be carried out using a 2-wire sensing method. For more accurate measurements, a 4-wire sensing method is preferred. Typical test equipment can include a programmable low noise DC power supply, able to supply sufficient current, and a fast voltmeter with sufficient precision and speed.

In contrast with existing methods of transient thermal testing of the die-attach between an LED and a mounting substrate, the inventive method uses the variation of the forward voltage of a photovoltaic cell during the application of the heating current. Thus, the evolution of the forward voltage is monitored, instead of the voltage before and after application of a heating current pulse.

Thus, with the inventive method, the extent of the voltage drop during the current injection provides a direct measurement for the die-attach of a photovoltaic cell assembly, in other words for the quality of the thermal interface between the photovoltaic cell and the base of the assembly, i.e., the heat sink, whereby insufficiently bonded photovoltaic cell assemblies can be identified and screened.

Further, like in known methods of transient thermal testing, in the inventive method, the device under test (DUT) must be able to withstand the heating current without being damaged. In the case of assembled photovoltaic cells, the photovoltaic cell must be able to withstand high current values, as these improve the precision of the measurements.

Further, for an injected current pulse, longer pulse durations further improve the precision of the measurements. Nevertheless, it is desirable to keep the tests as short as possible, while being sufficiently reliable for identifying defective photovoltaic cell assemblies. Thus, pulse durations in the range from about 50 ms to about 150 ms, preferably from about 80 ms to about 100 ms, in particular, about 90 ms, can be used and have been found advantageous.

Thus, as the inventive electrical test can be carried out in a very short time frame, it can be implemented not only as a sampling or characterization test but also, and especially, as an inline test. In other words, the inventive method provides a test usable for all the devices manufactured, which can be carried out right after the assembly in the manufacturing line of photovoltaic cell assemblies.

A main advantage of the inventive method is that it does not require any external temperature sensor, in fact, the photovoltaic cell itself acts as a temperature sensor. However, in contrast with known thermal transient testing methods, measurements of absolute values of the thermal resistance (Rth), are not relevant for the inventive method. Thus, no temperature calibration of the photovoltaic cell is needed. This has the advantage, over time-expensive known methods of thermal transient testing of the die-attach of photovoltaic cells in fully assembled photovoltaic modules under operating conditions, that the inventive method can be used for inline monitoring, as it completely avoids the time-consuming step of the temperature calibration. In fact, even very short heat ramps lead to a reliable detection.

Further, since the inventive method only requires assessing the relative change of the voltage measured across the photovoltaic cell, the unavoidable differences between individual tested devices have only a negligible influence on the measurements. In addition, since the test is only electrical, measurement precision and repeatability can be very good given the adequate test equipment.

When the assembled photovoltaic cell also comprises a bypass diode, the die-attach of the diode can be tested in analogous ways as the photovoltaic cell.

Further, the inventive test method can be used to characterize any types of die-attach, for instance, die-attach performed by soldering, welding, adhesive bonding, sintering, and the like.

In other words, the inventive method is faster and less complex than known methods of die-attach testing and, consequently, can be integrated in the manufacturing lines of photovoltaic cell assemblies. In particular, the inventive method can be used to sort out photovoltaic cell assemblies having a defective die-attach right after their assembly and, consequently, prevent their subsequent use in photovoltaic modules. Consequently, the quality and reliability of the assembled photovoltaic cells delivered at the end of the manufacturing line for subsequent use in photovoltaic modules are improved, whereby the quality and reliability of the fully assembled photovoltaic modules are also improved.

The inventive method is usable, not only for identifying photovoltaic cell assemblies having a defective die-attach, but can also be used to improve the manufacturing process in general to achieve lower thermal resistance of the assembled photovoltaic cells. Improving the assembly process can also result in reduced process variations. In particular, the inventive method can supplement other inline electrical tests related to other functional aspects of photovoltaic cells, whereby the quality of the assembled photovoltaic cells is generally improved.

BRIEF DESCRIPTION OF THE DRAWINGS

The invention will be described in more detail, based on advantageous embodiments described in combination with the following figures.

DETAILED DESCRIPTION

Figure 1:
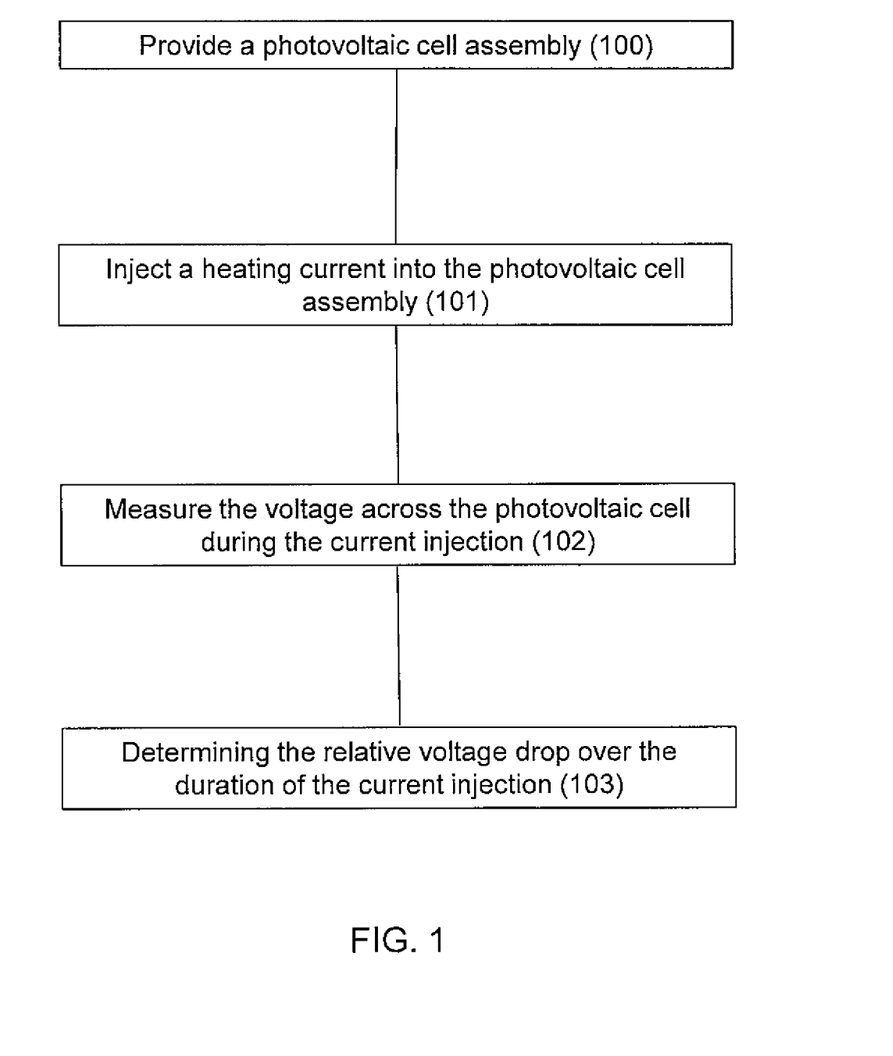
FIG. 1 schematically illustrates, in a block diagram, a first exemplary embodiment of the inventive method.

FIG. 1 schematically illustrates a first exemplary embodiment of the method according to the present invention in a bloc diagram. In a first step 100, an assembled photovoltaic cell, or photovoltaic cell assembly, is provided for testing its die-attach quality.

In the first embodiment, the photovoltaic cell assembly comprises a photovoltaic cell attached to a heat sink. In a preferred variant, the photovoltaic cell could be a concentrator photovoltaic (CPV) cell. Further, the attachment of the cell to the heat sink can have been done with common methods of die-attach such as soldering, welding, adhesive bonding, sintering or the like. For the sake of simplicity, the photovoltaic cell assembly of the first embodiment comprises one photovoltaic cell. However, it is understood that the die-attach quality of a photovoltaic cell assembly comprising more than one photovoltaic cell could also be tested using the inventive method on the various cells, either by carrying out measurements on the individual cells or on a plurality of cells, for instance, in a photovoltaic cell assembly comprising a plurality of cells connected to each other in series and/or in parallel.

In further variants, the assembled photovoltaic cell can also comprise a bypass diode electrically connected to the one or more photovoltaic cell(s) and also attached to the heat sink. Thus, the inventive method can also be used to measure the die-attach quality of the bypass diode of an assembled photovoltaic cell in an analogous manner as described hereafter for the photovoltaic cell itself.

In the first embodiment, in a subsequent step 101, a current is injected into the photovoltaic cell assembly to be tested. The current can be injected, for instance, using a programmable low noise DC power supply or the like. In order to keep the test as short as possible, especially when it is implemented as an inline test, it is preferable to inject a short current pulse. Thus, in the first embodiment, the duration of the injected current pulse varies from 50 ms to 150 ms, preferably from 80 ms to 100 ms, and can be, in particular, of about 90 ms. In general, it was observed that longer durations improved the precision of the measurements, but increased the overall testing time. Thus, while the values given above were found advantageous and are, therefore, preferred, in variants of the first embodiment, for instance, when implementing the test outside of the manufacturing line, it is also possible to inject current pulses having longer durations.

The current can also be preferably a high current in order to further improve the precision of the measurements. Thus, in the first embodiment, a high current pulse in the range from about 0.5 A to about 8 A is injected into the photovoltaic cell assembly.

According to the inventive method, during the current injection in a substantially parallel step 102, the forward voltage across the photovoltaic cell is measured. In particular, the forward voltage is measured during the whole duration of the current injection. Thus, in the first embodiment, the voltage is measured during the duration of the high forward current pulse. To this purpose, a fast voltmeter with sufficient precision and speed can be used such that measurements can be carried out continuously or at least very rapidly in order to produce an essentially continuous measurement of the forward voltage over the pulse duration.

Figure 3:
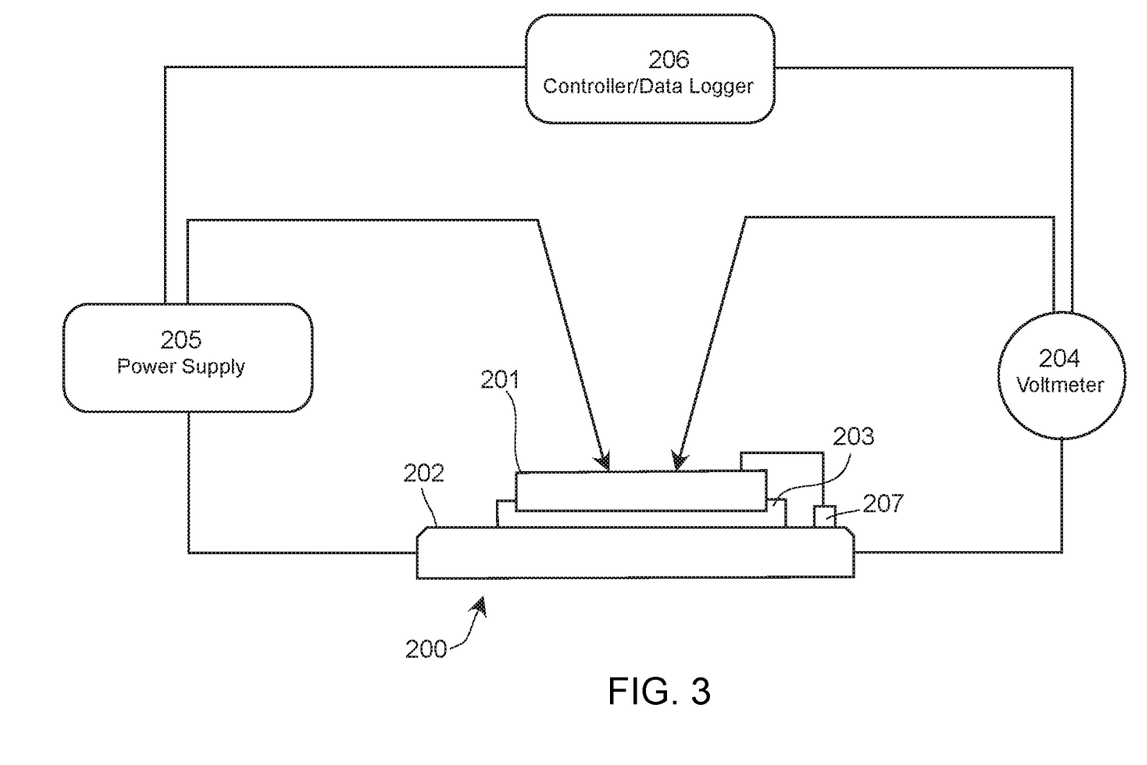
FIG. 3 schematically illustrates an exemplary setup used for carrying out the inventive method.
Figure 4:
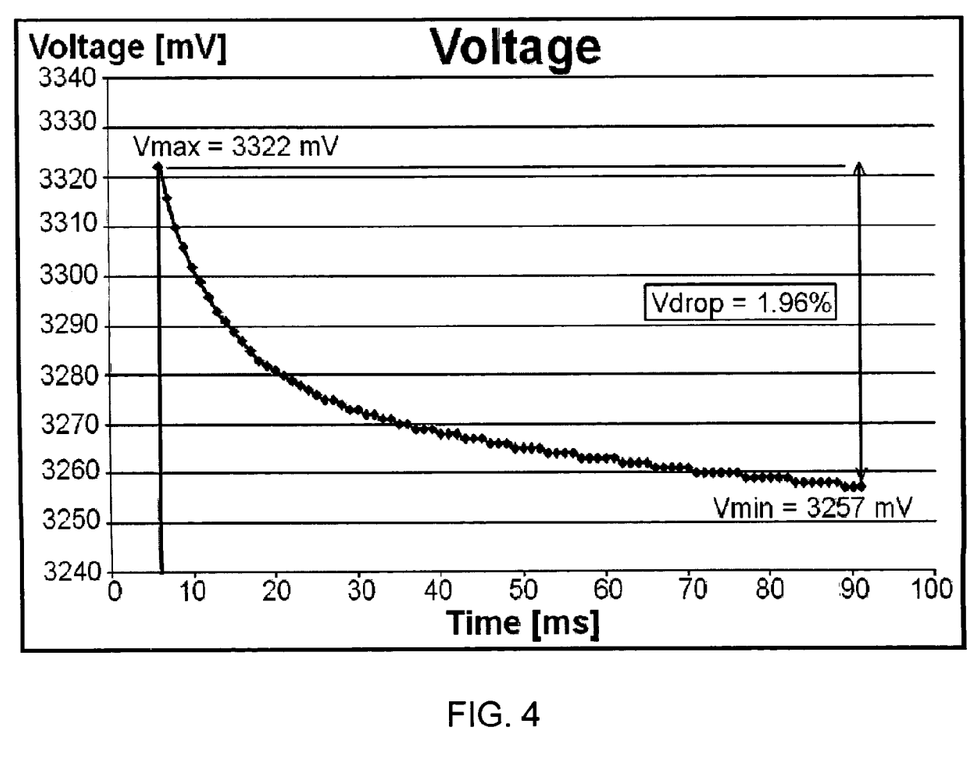
FIG. 4 schematically illustrates an exemplary relative voltage drop observed for a photovoltaic cell assembly tested with the inventive method.

FIG. 3 illustrates an exemplary instrumental setup usable to carry out the method in the first embodiment, and FIG. 4 illustrates a plot of the variation of the voltage across a tested photovoltaic cell over the entire duration of a high current pulse and will be discussed hereafter.

Thus, in the first embodiment, the quality of the die-attach 203 between solar cell 201 (e.g., photovoltaic cell) and heat sink 202 of a photovoltaic cell assembly 200 can be determined with a setup such as the one illustrated in FIG. 3, using a power supply 205, preferably a remote controlled DC power supply, and a voltmeter 204, preferably a fast voltmeter. According to the inventive method, as described with reference to FIG. 1 and step 101 in the first embodiment, the power supply 205 can be used to inject a current, preferably a high current, more preferably a high current pulse, as described above, into the photovoltaic cell assembly 200. The voltmeter 204 can then be used to measure the voltage across the solar cell 201, as described with reference to FIG. 1 and step 102 in the first embodiment. In a variant, also illustrated in FIG. 3, it is also possible to use a controller and/or data logger 206.

In the first embodiment, a 4-wire sensing method is used to obtain accurate forward measurements across the photovoltaic cell. Thus, in a variant of the first embodiment, a 4-wire resistance measurement can also be used, whereby the electrical resistance of the photovoltaic cell can also be determined. Alternatively, if less accuracy is acceptable, a 2-wire sensing method or resistance measurement could also be used.

In a subsequent step 103, the relative voltage drop over the duration of the current pulse is determined. It is, for instance, possible to use the data logger 206 illustrated in FIG. 3 to store the data relative to the voltage and output a plot of the type illustrated in FIG. 4 showing the relative voltage drop over the duration of the current injection, in particular, over the duration of the, preferably high, current pulse. Thus, it is possible to quickly and efficiently characterize the die-attach of the tested photovoltaic cell assembly using the inventive method, as the relative voltage drop directly reflects the thermal transfer properties of the interface layer between the photovoltaic cell and the underlying heat sink.

In the first embodiment, no external temperature sensor is needed. Furthermore, according to the inventive method, no measurements of absolute values of thermal resistances, Rth, are needed. Thus, no particular temperature calibration is required, which simplifies considerably the die-attach quality testing compared to thermal transient testing methods known in the art that are used to characterize the die-attach of photovoltaic cell assemblies in fully assembled photovoltaic modules during operating conditions. Furthermore, as previously described, in some embodiments, a bypass diode 207 may be electrically connected to the photovoltaic cell 201 and to the heat sink 202, and the method described herein can also be used to measure the die-attach quality of the bypass diode 207 of an assembled photovoltaic cell 200 in an analogous manner as described herein for the photovoltaic cell 201.

Figure 2:
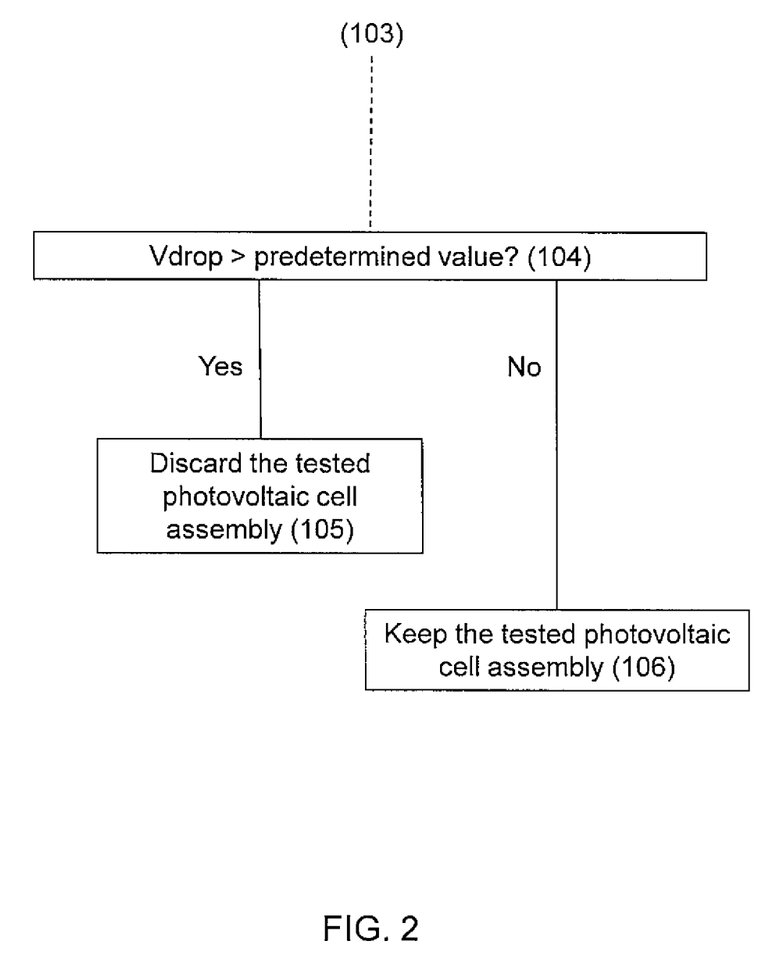
FIG. 2 schematically illustrates, in a further block diagram, a second exemplary embodiment of the inventive method.

FIG. 2 schematically illustrates a second exemplary embodiment of the inventive method. For the sake of simplicity, the second embodiment continues the first embodiment described above. However, it could also be implemented with any variant of the first embodiment.

After the step 103 of determining the relative voltage variation across the photovoltaic cell over the duration of the high pulse current, the second embodiment comprises a further step 104 of comparing the relative voltage drop to a predetermined value, in particular, a tolerance threshold value above which the die-attach is qualified as defective. This could be achieved, for instance, using data output by the controller/data logger 206 in the exemplary setup illustrated in FIG. 3.

In a particular embodiment, the current could be chosen higher than a predetermined threshold value above which the photovoltaic cell would be damaged if no sufficient heat exchange occurs. This threshold depends on the cell characteristics and may be easily modeled. In contrast to the prior art, the inventive method does not need to scan a complete heating sequence between two measurement points. Thus, it is possible to choose a current above this deterioration threshold in order to further reduce the time necessary to evaluate the die-attach quality. The efficient combination of the current and voltage threshold during a gradually controlled measurement sequence allows improving the throughput of sampling photovoltaic cell assemblies.

Thus, if the determined relative voltage drop is above the accepted tolerance value, then, in a subsequent step 105, the tested photovoltaic cell assembly is discarded as having a defective die-attach. Otherwise, in a subsequent step 106, it is kept as a photovoltaic cell assembly having a validated die-attach.

In an even harsher testing environment, the deterioration of the photovoltaic cell due to the excess heat not able to be extracted because of a low die-attach quality could be used in order to define one or more criteria for discarding such cells.

In the second embodiment, the inventive test method is performed as an electrical inline test incorporated in a manufacturing line for assembling photovoltaic cells. In a variant thereof, it could be incorporated as a separate test, outside the manufacturing line, for instance, just as a characterizing test. In a variant, it could be used, instead, at the beginning of a photovoltaic module assembly line in order to make sure that assembled modules only comprise photovoltaic cell assemblies having a validated die-attach. In all these variants, the exemplary setup illustrated in FIG. 3, or variants thereof, could be used.

As mentioned above, FIG. 4 is a plot illustrating an exemplary relative voltage drop measurable by monitoring the forward voltage across the photovoltaic cell of a tested photovoltaic cell assembly, for instance, in the first or second embodiments, using a setup such as the exemplary setup illustrated in FIG. 3, over the duration of an injected current. In this example, a current pulse is injected in an assembled photovoltaic cell, in particular, comprising a rather small standard triple-junction concentrator solar cell, at a current pulse starting time t=6 ms. The voltage V is measured continuously across the photovoltaic cell during the duration of the injected current pulse. An initial voltage peak is measured at Vmax=3322 mV at the beginning of the current pulse. In the example illustrated in FIG. 4, after about 86 ms, the voltage has progressively dropped to a value of Vmin=3257 mV, which results in a relative voltage drop of about Vdrop=1.96% over a pulse duration of about 90 ms.

In the example illustrated in FIG. 4, the relative voltage drop has allowed identification of a valid die-attach. The tested photovoltaic cell assembly is, therefore, characterized as valid and, consequently, kept immediately after the result of the test. For rather small standard triple-junction concentrator solar cells, a relative voltage drop threshold can thus be about 2%. However, in further embodiments, relative voltage drop threshold values can vary depending on the type and size of the cell, the die-attach method, the assembly process or other test parameters.

Thus, if the inventive test method is performed at the end of the manufacturing line of photovoltaic cell assemblies, for instance, following the second embodiment illustrated in FIG. 2, it is possible to immediately select the photovoltaic cell assemblies with a good die-attach (step 106). The good photovoltaic cell assemblies can then be selected for further use, in particular, for use in a fully assembled photovoltaic module. In contrast, photovoltaic cell assemblies with a defective die-attach can be identified immediately and discarded (step 105) such that they are not used in the process of assembling photovoltaic modules. Thus, the quality of the delivered photovoltaic cell assemblies at the end of the manufacturing line is improved by the inventive electrical inline die-attach test method.

In the embodiments described above and in variants thereof, the inventive method can be implemented separate from the manufacturing process. For instance, the method can be used to test the die-attach quality of photovoltaic cells delivered to a photovoltaic module manufacturer/assembler, prior to the assembly process of the modules, in order to discard invalid photovoltaic cell assemblies.

In preferred variants, the inventive method can be implemented as a part of the photovoltaic cells manufacturing process and, therefore, as an inline test. For instance, as soon as photovoltaic cells are assembled with corresponding heat sinks, the method could be used to immediately select the viable photovoltaic cell assemblies from the ones having a defective die-attach. Thus, the earlier the test is implemented in the various assembly processes, the earlier it is possible to discard deficient photovoltaic cell assemblies. This is advantageous for photovoltaic cell manufacturers that deliver assembled photovoltaic cells to third parties such as module manufacturers. It is also advantageous for a manufacturer and assembler that would redirect the assembled photovoltaic cells to a module assembly line. In either case, only assembled cells with good die-attach quality would be selected for further use.

As a result, the inventive method is usable, not only for identifying photovoltaic cell assemblies having a defective die-attach, but also for improving their manufacturing process in general, for instance, by achieving lower thermal resistance of the assembled photovoltaic cells, or by improving the process to reduce process variations. Thus, in general, the present invention allows for a short feedback loop for process optimizations. In particular, the inventive method can supplement other inline electrical tests related to further functional aspects of photovoltaic cells, whereby the quality of the assembled photovoltaic cells is generally improved.

As a further result, any of the embodiments of the inventive method and variants thereof can be integrated in photovoltaic cell manufacturing lines and/or in photovoltaic module assembly lines. In particular, the inventive method can be used for electrical inline testing the die-attach quality of assembled photovoltaic cells at the end of the manufacturing line, and/or in early stages of a module assembly line.

Thus, it is possible to screen photovoltaic cell assemblies with a defective die-attach and avoid using them at a later stage. As a consequence, the quality and reliability of the assembled photovoltaic cells delivered at the end of the manufacturing line is improved in comparison to the prior art, whereby the quality and reliability of final products, such as the fully assembled photovoltaic modules, are also improved.

The invention claimed is:

1. A method for testing a die-attach of a photovoltaic cell assembly, the method comprising the steps of:

providing a photovoltaic cell assembly comprising at least one concentrator photovoltaic cell attached to a heat sink by die-attach;

injecting a current into the photovoltaic cell assembly;

measuring continuously a voltage across the at least one concentrator photovoltaic cell during the current injection; and determining a relative voltage drop during the whole duration of the current injection; and characterizing the die-attach quality of the photovoltaic assembly.

2. The method according to claim 1, further comprising a step of determining whether the relative voltage drop over the duration of the current injection is higher than a predetermined threshold.

3. The method according to claim 2, further comprising a step of discarding the tested photovoltaic cell assembly if the determined relative voltage drop is higher than the predetermined threshold.

4. The method according to claim 3, further comprising the step of keeping the tested photovoltaic cell assembly if the determined relative voltage drop is lower than or equal to the predetermined threshold.

5. The method according to claim 4, wherein the photovoltaic cell assembly further comprises a bypass diode attached to the heat sink and electrically connected to the at least one concentrator photovoltaic cell, and wherein the method further comprises a step of measuring the voltage across the bypass diode during the current injection.

6. The method according to claim 5, further comprising a step of determining an electrical resistance of the at least one concentrator photovoltaic cell or the bypass diode during the current injection.

7. The method according to claim 6, wherein measuring the voltage is carried out by a 4-wire or a 2-wire sensing method.

8. The method according to claim 7, wherein the injected current is in the range extending from 0.5 A to 8 A.

9. The method according to claim 8, wherein the step of injecting a current comprises injecting a single current pulse.

10. The method according to claim 9, wherein the duration of the current pulse is in the range extending from 50 ms to 150 ms.

11. The method according to claim 10, wherein the duration of the current pulse is in the range extending from 80 ms to 100 ms.

12. The method according to claim 11, wherein the duration of the current pulse is about 90 ms.

13. The method according to claim 2, wherein the predetermined threshold of the relative voltage drop is 2%.

14. The method according to claim 2, further comprising the step of keeping the tested photovoltaic cell assembly if the determined relative voltage drop is lower than or equal to the predetermined threshold.

15. The method according to claim 1, wherein the photovoltaic cell assembly further comprises a bypass diode attached to the heat sink and electrically connected to the at least one concentrator photovoltaic cell, and wherein the method further comprises a step of measuring the voltage across the bypass diode during the current injection.

16. The method according to claim 1, further comprising a step of determining an electrical resistance of the at least one concentrator photovoltaic cell during the current injection.

17. The method according to claim 1, wherein measuring the voltage is carried out by a 4-wire or a 2-wire sensing method.

18. The method according to claim 1, wherein the injected current is in the range extending from 0.5 A to 8 A.

19. The method according to claim 1, wherein the step of injecting a current comprises injecting a single current pulse.

20. The method according to claim 1, wherein the duration of the current pulse is in the range extending from 50 ms to 150 ms.

* * * * *